(12) United States Patent
Scott et al.

(10) Patent No.: US 10,443,314 B2
(45) Date of Patent: Oct. 15, 2019

(54) METHODS FOR FORMING INSTRUMENTED CUTTING ELEMENTS OF AN EARTH-BORING DRILLING TOOL

(71) Applicants: Baker Hughes, a GE company, LLC, Houston, TX (US); Element Six Limited, London (GB)

(72) Inventors: Danny E. Scott, Montgomery, TX (US); Timothy Peter Mollart, London (GB); John Robert Brandon, London (GB)

(73) Assignees: Baker Hughes, a GE company, LLC, Houston, TX (US); Element Six Limited, London (GB)

( * ) Notice: Subject to any disclaimer, the term of this patent is extended or adjusted under 35 U.S.C. 154(b) by 209 days.

(21) Appl. No.: 15/456,105

(22) Filed: Mar. 10, 2017

(65) Prior Publication Data
US 2017/0183915 A1    Jun. 29, 2017

Related U.S. Application Data

(63) Continuation of application No. 13/586,650, filed on Aug. 15, 2012, now Pat. No. 9,605,487.

(51) Int. Cl.
*E21B 10/567* (2006.01)
*B23P 15/32* (2006.01)
(Continued)

(52) U.S. Cl.
CPC ............ *E21B 10/567* (2013.01); *B23P 15/32* (2013.01); *B24D 18/0009* (2013.01);
(Continued)

(58) Field of Classification Search
CPC ............... E21B 10/567; E21B 10/5673; E21B 10/5676; E21B 10/573; E21B 10/5735; B23P 15/32
(Continued)

(56) References Cited

U.S. PATENT DOCUMENTS

| 4,122,387 A | 10/1978 | Ajam et al. |
| 4,268,276 A | 5/1981 | Bovenkerk |

(Continued)

FOREIGN PATENT DOCUMENTS

| CA | 2848298 A1 | 11/2011 |
| CN | 1603576 A | 4/2005 |

(Continued)

OTHER PUBLICATIONS

DiGiovanni et al., U.S. Appl. filed Apr. 11, 2012, and entitled "Apparatuses and Methods for At-Bit Resistivity Measurements for an Earth-Boring Drilling Tool"., U.S. Appl. No. 61/623,042.

(Continued)

*Primary Examiner* — Jason Daniel Prone
(74) *Attorney, Agent, or Firm* — TraskBritt

(57) ABSTRACT

A method of forming an instrumented cutting element comprises forming a free-standing sintered diamond table having at least one chamber in the free-standing sintered diamond table, providing a doped diamond material within the at least one chamber, and attaching a substrate to the free-standing sintered diamond table to form an instrumented cutting element. The instrumented cutting element includes the doped diamond material disposed within the sintered diamond table on the substrate. A method of forming an earth-boring tool comprises attaching at least one instrumented cutting element to a body of an earth-boring tool. The at least one instrumented cutting element has a diamond table bonded to a substrate. The diamond table has at least one sensing element disposed at least partially within the diamond table. The at least one sensing element comprises a doped diamond material.

20 Claims, 9 Drawing Sheets

(51) Int. Cl.
 *B24D 18/00* (2006.01)
 *B24D 99/00* (2010.01)
 *E21B 47/01* (2012.01)
 *E21B 47/00* (2012.01)
(52) U.S. Cl.
 CPC ............ *B24D 99/005* (2013.01); *E21B 47/00* (2013.01); *E21B 47/01* (2013.01)
(58) Field of Classification Search
 USPC .............................................. 76/108.1–108.6
 See application file for complete search history.

(56) References Cited

U.S. PATENT DOCUMENTS

| | | | |
|---|---|---|---|
| 4,858,063 | A | 8/1989 | Laue et al. |
| 6,206,108 | B1 | 3/2001 | MacDonald et al. |
| 6,233,524 | B1 | 5/2001 | Harrell et al. |
| 6,359,438 | B1 | 3/2002 | Bittar |
| 6,404,003 | B1 | 6/2002 | McMillan et al. |
| 6,850,068 | B2 | 2/2005 | Chemali et al. |
| 7,109,719 | B2 | 9/2006 | Fabris et al. |
| 7,256,582 | B2 | 8/2007 | Gorek et al. |
| 7,388,380 | B2 | 6/2008 | Chen et al. |
| 7,407,566 | B2 | 8/2008 | Jiang et al. |
| 7,697,375 | B2 | 4/2010 | Reiderman et al. |
| 7,758,734 | B2 | 7/2010 | Jiang et al. |
| 7,849,934 | B2 | 12/2010 | Pastusek et al. |
| 7,946,357 | B2 | 5/2011 | Trinh et al. |
| 8,006,781 | B2 | 8/2011 | Teodorescu et al. |
| 8,203,134 | B2 | 6/2012 | Liu |
| 8,203,344 | B2 | 6/2012 | Gold et al. |
| 8,440,535 | B2 | 5/2013 | Dennison |
| 8,937,292 | B2 | 1/2015 | Bateman |
| 8,997,900 | B2 | 4/2015 | Sue et al. |
| 9,133,668 | B2 | 9/2015 | Cardellini et al. |
| 9,212,546 | B2 | 12/2015 | Scott et al. |
| 9,406,877 | B2 | 8/2016 | Tada et al. |
| 9,598,948 | B2 | 3/2017 | Scott et al. |
| 9,605,487 | B2 * | 3/2017 | Scott et al. ............. B23P 15/32 |
| 2005/0029095 | A1 | 2/2005 | Hall |
| 2006/0243603 | A1 | 11/2006 | Jiang et al. |
| 2007/0114061 | A1 | 5/2007 | Hall et al. |
| 2008/0011521 | A1 | 1/2008 | Hall et al. |
| 2008/0156534 | A1 | 7/2008 | Clark et al. |
| 2008/0230280 | A1 | 9/2008 | Keshavan et al. |
| 2008/0257730 | A1 | 10/2008 | Jiang et al. |
| 2009/0205822 | A1 | 8/2009 | DiFoggio et al. |
| 2009/0309600 | A1 | 12/2009 | Seydoux et al. |
| 2010/0051292 | A1 | 3/2010 | Trinh et al. |
| 2010/0139975 | A1 | 6/2010 | Teodorescu et al. |
| 2010/0282510 | A1 | 11/2010 | Sullivan et al. |
| 2010/0295548 | A1 | 11/2010 | Georgi et al. |
| 2011/0036641 | A1 | 2/2011 | Lyons |
| 2011/0057656 | A1 | 3/2011 | Tchakarov et al. |
| 2011/0259642 | A1 | 10/2011 | DiGiovanni et al. |
| 2011/0266054 | A1 | 11/2011 | Kumar et al. |
| 2011/0266055 | A1 | 11/2011 | DiGiovanni et al. |
| 2011/0266058 | A1 | 11/2011 | Kumar et al. |
| 2012/0132468 | A1 | 5/2012 | Scott et al. |
| 2012/0152617 | A1 | 6/2012 | Hunt et al. |
| 2012/0152622 | A1 | 6/2012 | Sue et al. |
| 2012/0181900 | A1 | 7/2012 | Puocio et al. |
| 2012/0303347 | A1 | 11/2012 | DiFoggio |
| 2012/0312598 | A1 | 12/2012 | Cheng |
| 2012/0325564 | A1 | 12/2012 | Vaughn et al. |
| 2013/0088364 | A1 | 4/2013 | Bittar et al. |
| 2013/0270007 | A1 | 10/2013 | Scott et al. |
| 2013/0270008 | A1 | 10/2013 | DiGiovanni et al. |
| 2014/0047776 | A1 | 2/2014 | Scott et al. |
| 2016/0056208 | A1 | 2/2016 | Pellizzer et al. |
| 2016/0133671 | A1 | 5/2016 | Fantini et al. |
| 2017/0175520 | A1 | 6/2017 | Scott et al. |
| 2018/0334858 | A1 | 11/2018 | Can |

FOREIGN PATENT DOCUMENTS

| | | |
|---|---|---|
| GB | 2483769 A | 3/2012 |
| WO | 2011090481 A1 | 7/2011 |
| WO | 2013191974 A2 | 12/2013 |

OTHER PUBLICATIONS

European Office Action for European Application No. 13829871.6 dated Jul. 27, 2017, 4 pages.
Canadian Office Action for Canadian Application No. 2,882,113, dated Feb. 22, 2016, 4 pages.
Archie III: Electrical Conduction in Shaly Sands; Oct. 1989, Oilfield Review, vol. 1, Issue 3, pp. 43-53.
Supplementary European Search Report for European Application No. 13829871 dated Sep. 6, 2016, 11 pages.
International Preliminary Report on Patentability for International Application No. PCT/US20131055055, dated Feb. 17, 2015, 9 pages.
International Search Report for International Application No. PCT/US2013/055055 dated Nov. 25, 2013, 6 pages.
International Written Opinion for International Application No. PCT/US2013/055055 dated Nov. 25, 2013, 7 pages.
Kong et al., A Theoretical Calculation of the Piezoresistivity and Magnetoresistivity in P-Type Semiconducting Diamond Films, Journal of Physics: Condensed Matter, vol. 14, pp. 1765-1774 (2002).
Supplemental Partial European Search Report fo European Application No. 13829871 dated Jun. 8, 2016, 4 pages.
European Extended Search Report and Opinion for European Application No. 18191480.5, dated Nov. 7, 2018, 11 pages.
Indian Examination Report for Indian Application No. 1240/DELNP/2015, dated Mar. 8, 2019, 5 pages.

* cited by examiner

METHODS FOR FORMING INSTRUMENTED CUTTING ELEMENTS OF AN EARTH-BORING DRILLING TOOL

CROSS REFERENCE TO RELATED APPLICATIONS

This application is a continuation of U.S. patent application Ser. No. 13/586,650, filed Aug. 15, 2012, now U.S. Pat. No. 9,605,487, issued Mar. 28, 2017, the disclosure of which is hereby incorporated herein in its entirety by this reference. This application is also related to U.S. Provisional Patent Application No. 61/623,042, filed Apr. 11, 2012, and entitled "Apparatuses and Methods for At-Bit Resistivity Measurements for an Earth-Boring Drilling Tool," and U.S. patent application Ser. No. 13/586,668, filed Aug. 15, 2012, now U.S. Pat. No. 9,212,546, issued Dec. 15, 2015, and entitled "Apparatuses and Methods for Obtaining At-Bit Measurements for an Earth-Boring Drilling Tool," the disclosure of each of which is hereby incorporated herein in its entirety by this reference.

TECHNICAL FIELD

The present disclosure generally relates to instrumented cutting elements for use on earth-boring tools such as drill bits, to earth-boring tools including such instrumented cutting elements, and methods of making and using such cutting elements and tools.

BACKGROUND

The oil and gas industry expends sizable sums to design cutting tools, such as downhole drill bits including roller cone rock bits and fixed cutter bits. Such drill bits may have relatively long service lives with relatively infrequent failure. In particular, considerable sums are expended to design and manufacture roller cone rock bits and fixed cutter bits in a manner that minimizes the probability of catastrophic drill bit failure during drilling operations. The loss of a roller cone or a polycrystalline diamond compact from a bit during drilling operations can impede the drilling operations and, at worst, necessitate rather expensive operations for retrieving the bit or components thereof from the wellbore.

Diagnostic information related to a drill bit and certain components of the drill bit may be linked to the durability, performance, and the potential failure of the drill bit. In addition, characteristic information regarding the rock formation may be used to estimate performance and other characteristics related to drilling operations. Logging while drilling (LWD) and measuring while drilling (MWD) measurements are conventionally obtained from measurements behind (e.g., several feet away from) the drill head. While a number of sensors and measurement systems may record information near the earth-boring drill bit, conventional polycrystalline diamond compact (PDC) cutting elements used in earth-boring drill bits do not provide measurements directly at the drill bit. The off-set from the earth-boring drill bit may contribute to errors for many types of measurements, especially those measurements that relate directly to the performance or the condition of the earth-boring drill bit itself.

DETAILED DESCRIPTION

Figure 1:
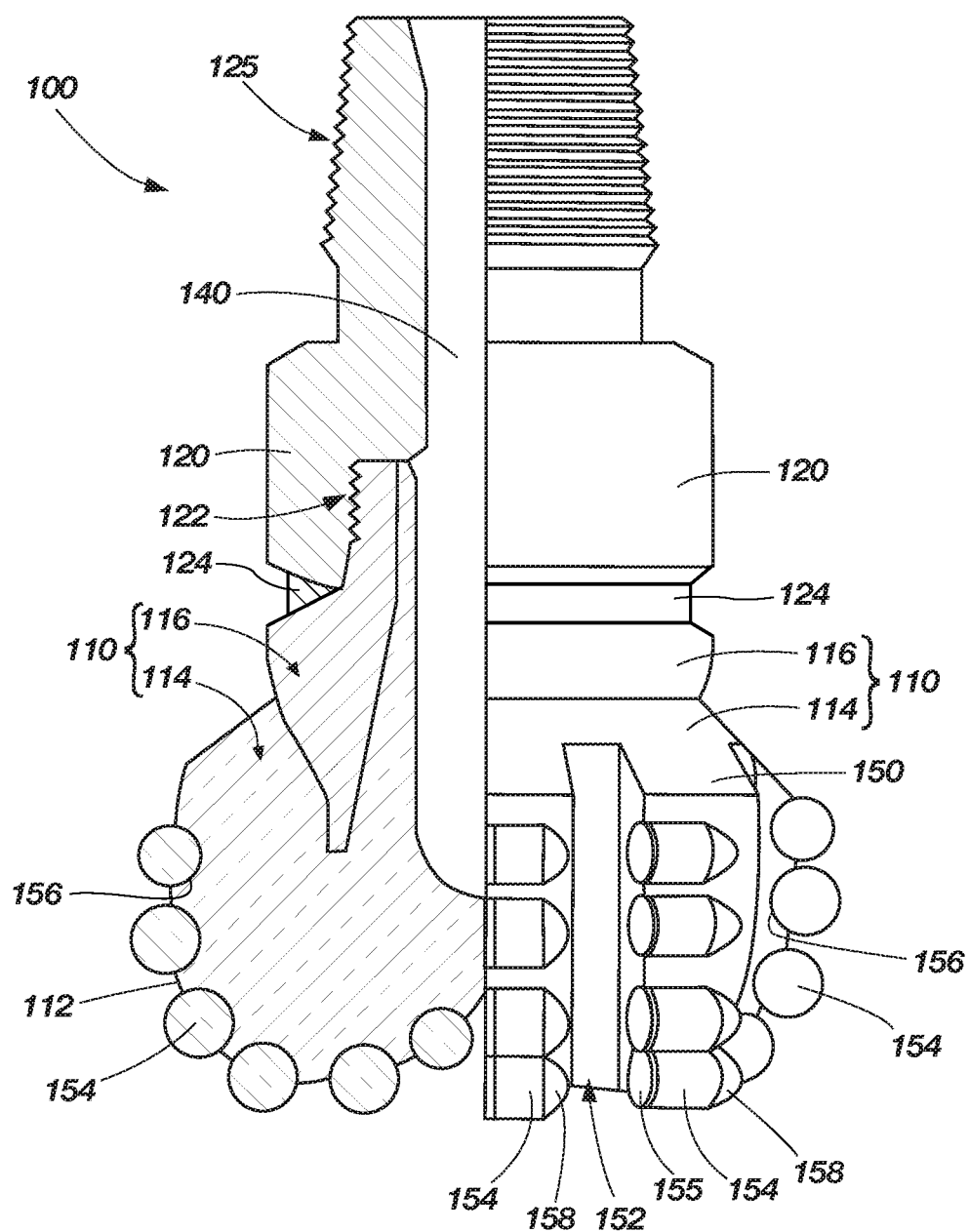
FIG. 1 illustrates a simplified cross-sectional side view of an earth-boring drill bit that may include instrumented cutting elements as described herein.

In the following detailed description, reference is made to the accompanying drawings that form a part hereof and, in which are shown by way of illustration, specific embodiments in which the invention may be practiced. These embodiments are described in sufficient detail to enable those of ordinary skill in the art to practice the invention, and it is to be understood that other embodiments may be utilized, and changes may be made within the scope of the disclosure.

Referring in general to the following description and accompanying drawings, various embodiments of the present disclosure are illustrated to show its structure and method of operation. Common elements of the illustrated embodiments may be designated with similar reference numerals. It should be understood that the figures presented are not meant to be illustrative of actual views of any particular earth-boring tool or cutting element, but are merely idealized representations employed to more clearly and fully depict the present invention defined by the claims below. The illustrated figures may not be drawn to scale.

As used herein, "drill bit" means and includes any type of bit or tool used for drilling during the formation or enlargement of a wellbore in subterranean formations and includes, for example, fixed cutter bits, rotary drill bits, percussion bits, core bits, eccentric bits, bi-center bits, reamers, mills, drag bits, roller cone bits, hybrid bits and other drilling bits and tools known in the art.

As used herein, the term "polycrystalline material" means and includes any material comprising a plurality of grains or crystals of the material that are bonded directly together by inter-granular bonds. The crystal structures of the individual grains of the material may be randomly oriented in space within the polycrystalline material.

As used herein, the term "polycrystalline compact" means and includes any structure comprising a polycrystalline material formed by a process that involves application of pressure (e.g., compaction) to the precursor material or materials used to form the polycrystalline material.

As used herein, the term "hard material" means and includes any material having a Knoop hardness value of about 3,000 Kg/mm$^2$ (29,420 MPa) or more. Hard materials include, for example, diamond and cubic boron nitride.

Embodiments of the present disclosure include instrumented cutting elements for earth-boring drill bits, and methods for forming such instrumented cutting elements. The instrumented cutting elements may provide measurements obtained directly from locations at the drill bit to which they are mounted and used. The instrumented cutting elements may be used to identify formation characteristics, which may be used to improve identification of chemicals and pay zones within the formation. The instrumented cutting elements also may be used to improve (e.g., optimize) drilling parameters. In addition, at-bit measurements and real-time formation evaluation obtained using the instrumented cutting elements may reduce risk of loss or damage to the cutting elements and/or the earth-boring drill bit to which the cutting elements are mounted.

FIG. 1 illustrates a simplified cross-sectional side view of an earth-boring drill bit 100 that may include instrumented cutting elements as described herein. The earth-boring drill bit 100 includes a bit body 110. The bit body 110 of the earth-boring drill bit 100 may be formed from steel. In some embodiments, the bit body 110 may be formed from a particle-matrix composite material. For example, the bit body 110 may further include a crown 114 and a steel blank 116. The steel blank 116 is partially embedded in the crown 114. The crown 114 may include a particle-matrix composite material such as, for example, particles of tungsten carbide embedded in a copper alloy matrix material. The bit body 110 may be secured to a shank 120 by way of a threaded connection 122 and/or a weld 124 extending around the earth-boring drill bit 100 on an exterior surface thereof along an interface between the bit body 110 and the shank 120. Other methods may be used to secure the bit body 110 to the shank 120.

The earth-boring drill bit 100 includes a plurality of cutting elements 154 attached to a 112 of the bit body 110, one or more of which may comprise an instrumented cutting element as described herein in further detail below. Generally, the cutting elements 154 of a fixed-cutter type drill bit have either a disk shape or a substantially cylindrical shape. Each cutting element 154 may include a cutting surface 155 located on a substantially circular end surface of the cutting element 154. The cutting surface 155 may be formed by disposing a hard, superabrasive material, such as a polycrystalline diamond compact in the form of a "diamond table." As known in the art, such a diamond table may be formed by subjecting diamond particles to high temperature, high pressure (HTHP conditions in the presence of a metal solvent catalyst (e.g., one or more of cobalt, iron, and nickel). Such an HTHP sintering process results in the formation of direct inter-granular diamond-to-diamond atomic bonds between the diamond particles, which forms the diamond table comprising the polycrystalline diamond compact. In some embodiments, the diamond table may be formed on a supporting substrate during the HTHP sintering process. In other embodiments, the diamond table may be formed in an HTHP sintering process, and subsequently bonded to a separately formed supporting substrate. Such cutting elements 154 are often referred to as polycrystalline diamond compact (PDC) cutting elements 154. The cutting elements 154 may be provided along blades 150 on the face 112 of the bit body 110. Pockets 156 may be formed in the face 112 of the bit body 110, and the cutting elements 154 may be secured to the bit body 110 within the pockets 156 using a brazing process, for example. In some instances, the cutting elements 154 may be supported from behind by buttresses 158, which may be integrally formed with the crown 114 of the bit body 110.

The bit body 110 may further include junk slots 152 that separate the blades 150. Internal fluid passageways (not shown) extend between the face 112 of the bit body 110 and a longitudinal bore 140, which extends through the shank 120 and partially through the bit body 110. Nozzle inserts (not shown) also may be provided at the face 112 of the bit body 110 within the internal fluid passageways.

The earth-boring drill bit 100 may be secured to the end of a drill string (not shown), which may include tubular pipe and equipment segments (e.g., drill collars, a motor, a steering tool, stabilizers, etc.) coupled end to end between the earth-boring drill bit 100 and other drilling equipment at the surface of the formation to be drilled. As one example, a threaded connection portion 125 of the earth-boring drill bit 100 may be engaged with a complementary threaded connection portion of the drill string. An example of such a threaded connection portion is an American Petroleum Institute (API) threaded connection portion.

During drilling operations, the earth-boring drill bit 100 is positioned at the bottom of a wellbore such that the cutting elements 154 are adjacent the earth formation to be drilled. Equipment such as a rotary table or a top drive may be used for rotating the drill string and the earth-boring drill bit 100 within the wellbore hole. Alternatively, the shank 120 of the earth-boring drill bit 100 may be coupled to the drive shaft of a down-hole motor, which may be used to rotate the earth-boring drill bit 100. As the earth-boring drill bit 100 is rotated, drilling fluid is pumped to the face 112 of the bit body 110 through the longitudinal bore 140 and the internal fluid passageways (not shown). Rotation of the earth-boring drill bit 100 causes the cutting elements 154 to scrape across and shear away the surface of the underlying formation. The formation cuttings mix with, and are suspended within, the drilling fluid and pass through the junk slots 152 and the annular space between the wellbore hole and the drill string to the surface of the earth formation.

When the cutting elements 154 scrape across and shear away the surface of the underlying formation, a significant amount of heat and mechanical stress may be generated. Components of the earth-boring drill bit 100 (e.g., cutting elements 154) may be configured for detection of performance data during drilling operations, as will be discussed herein with respect to FIGS. 2 through 13C. For example, embodiments of the present disclosure may include at least one sensing element carried by one or more of the cutting elements 154, which may be used to obtain real-time data related to the performance of the cutting element 154, the earth-boring drill bit 100, and/or characteristics of the rock formation, such as resistivity, impedance, resistance, and reactance measurements. In other words, characteristics of the cutting element 154, earth-boring drill bit 100, and the rock formation may be determined during drilling. For example, resistivity measurements may be indicative of hardness of the rock formation. In some embodiments, the real-time data may include porosity determinations. Diagnostic information related to the actual performance of the earth-boring drill bit 100 and characteristics of the rock formation may be obtained through analysis of the data signals generated by the sensing elements. The information collected from the instrumented cutting element 154 may be communicated up the drill string either in real-time while drilling or after completing a section of drilling.

As will be described below, various types of measurements may be made from one or more instrumented cutting elements 154, such as from a plurality of instrumented cutting elements 154 positioned at various locations on the earth-boring drill bit 100. In some embodiments, instrumented cutting elements 154 may be positioned in non-cutting orientations and locations for the purpose of enhancing measurements and/or providing redundancy. For example, if temperature is desired to be measured, instrumented cutting elements 154 may be provided, which are configured to measure temperature at or near the tip of the instrumented cutting element 154. In addition, a plurality of instrumented cutting elements 154 may be located at different locations, which may provide a temperature profile for the earth-boring drill bit 100 itself. Thus, in some embodiments, not all cutting elements 154 may be instrumented cutting elements 154, and the instrumented cutting elements 154 may be disposed at selected locations on the face 112 of the earth-boring drill bit 100.

Various instrumented cutting elements 154 described herein may be manufactured by using doped diamond grains in a portion of the polycrystalline diamond material in the diamond table comprising the polycrystalline diamond compact. For example, a portion of the polycrystalline diamond material may be diamond grains doped with materials, such as boron, phosphorous, sulfur, or other materials that are either shallow electron donors or electron acceptors capable of inducing significant charge carrier densities at temperatures below e.g., 600° C. By doping selected portions or regions of the polycrystalline diamond material, the conductivity of the doped portion of the polycrystalline diamond material may be increased relative to the remainder of the polycrystalline diamond material. Metal solvent catalyst, which may be present in the interstitial spaces between the inter-bonded diamond grains in the polycrystalline diamond table may be removed from the polycrystalline diamond table proximate the doped portions (e.g., surrounding the doped portions) to decrease the conductivity of those regions relative to the conductivity of the doped regions. As a result, the doped portions of the diamond material of the cutting elements 154 may exhibit properties of an electrical conductor, and the surrounding other regions of the diamond material of the cutting elements 154 may exhibit properties of an electrical insulator.

Embodiments of the present disclosure include cutting elements 154 that incorporate sensing elements as the first line of detection for certain parameters related to the cutting element 154, other components of the earth-boring drill bit 100, the formation, or combinations thereof. Calibrating resistance measurements by the instrumented cutting elements 154 during drilling may enable correlating wear condition, active depth of cut control, understanding the extent of formation engagement while drilling, pad-type formation resistivity measurements, and/or identifying where in the earth-boring drill bit 100 instabilities may originate. In other words, the resistance of the cutting element can be measured and used to determine wear. As a result, active bit control may be enabled. In other words, this information may be used as part of an active bit control system.

Additional instrumented components of the earth-boring drill bit 100 may perform secondary detection of performance data. The measurements described herein may also be used in conjunction with other sensor components in the wellbore assembly, such as thermocouples, thermistors, chemical sensors, acoustic transducers, gamma detectors, etc. Acoustic transducers may include time-of-flight measurements to detect wear of the cutting elements 154. Wear of the cutting element 154 may also be determined through electrical measurements. Examples of such other related sensors may be described in U.S. Patent Application Publication No. 2011/0266058, filed Apr. 25, 2011, and entitled "PDC Sensing Element Fabrication Process and Tool," U.S. Patent Application Publication No. 2011/0266054, filed Apr. 25, 2011, and entitled "At-Bit Evaluation of Formation Parameters and Drilling Parameters," U.S. Patent Application Publication No. 2011/0266055, filed Apr. 25, 2011, and entitled "Apparatus and Methods for Detecting Performance Data in an Earth-Boring Drilling Tool," and U.S. patent application Ser. No. 13/159,164, filed Jun. 13, 2011, and entitled "Apparatuses and Methods for Determining Temperature Data of a Component of an Earth-Boring Drilling Tool," the disclosure of each of the forgoing applications being incorporated herein by this reference in their entirety.

Figure 2:
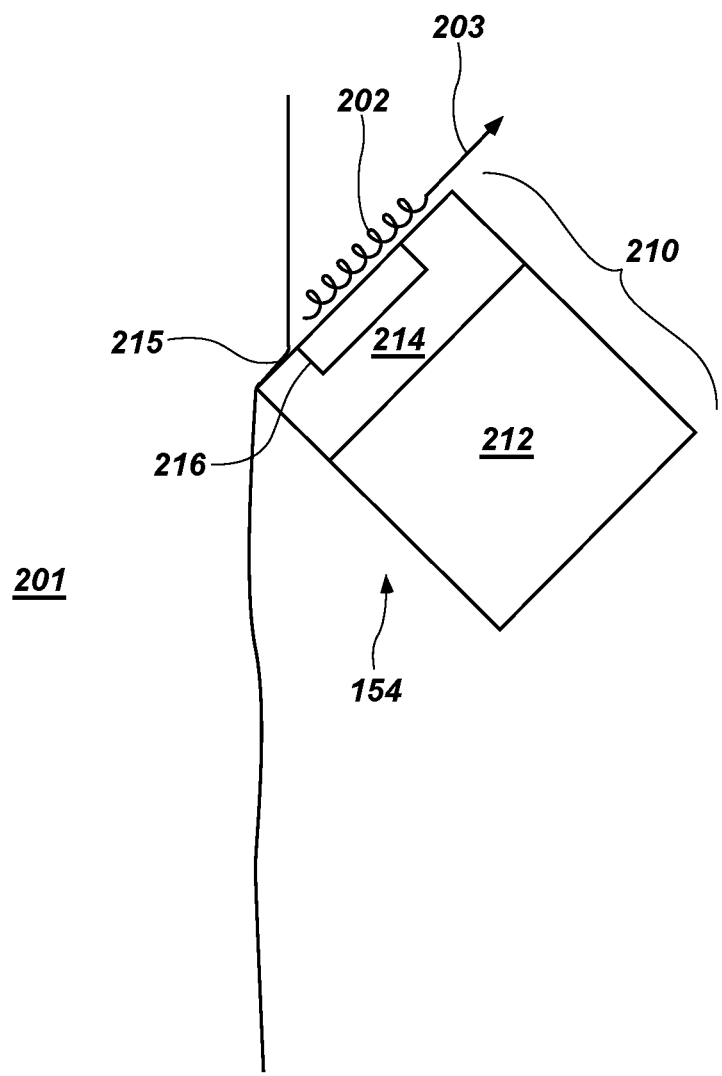
FIG. 2 is a simplified and schematically illustrated drawing of an instrumented cutting element of FIG. 1 engaging a subterranean formation.

FIG. 2 is a simplified and schematically illustrated drawing of an instrumented cutting element 154 of FIG. 1 engaging a subterranean formation 201. For simplicity, the cutting element 154 is shown separately without showing detail for the associated earth-boring drill bit. The cutting element 154 may be configured as a PDC compact 210 that includes a substrate 212 coupled with a diamond table 214 having a cutting surface 215. In some embodiments, the cutting element 154 may have a generally cylindrical shape. In other embodiments, the cutting elements 154 may have other shapes, such as conical, brutes, ovoids, etc.

The cutting element 154 further includes one or more sensing elements 216. The sensing element 216 may be disposed within the diamond table 214, such as by being embedded or at least partially formed within the diamond table 214. As a result, the sensing element 216 may be located at or near the cutting surface 215 of the cutting element 154.

In some embodiments, the sensing element 216 may be formed during an HTHP sintering process used to form the cutting element 154. The HTHP process may include sintering diamond powder used to form the diamond table 214 of the cutting element 154 at a temperature of at least 1300° Celsius and a pressure of at least 5.0 GPa. In some embodiments, the diamond table 214 may be formed as a standalone object (e.g., a free-standing diamond table) to facilitate the addition of the sensing element 216, and the diamond table 214 may be attached to the substrate 212. Further details regarding various configurations of the cutting element 154, and formation thereof, will be discussed below.

In operation, the cutting element 154 may scrape across and shear away the surface of the formation. Cuttings 202 from the subterranean formation 201 may pass across the sensing element 216 as indicated by arrow 203. In some embodiments, the sensing element 216 may be configured to generate an electrical signal indicative of at least one parameter (e.g., temperature, load, etc.) of the cutting element 154.

In some embodiments, the sensing element 216 may be configured to generate an electrical signal indicative of a parameter (e.g., resistivity) of the subterranean formation. For example, the sensing element 216 may be energized, causing current to flow through the subterranean formation 201 or the cuttings 202 in contact with the energized sensing element 216. As a result, resistivity measurements may be taken from a measured voltage and/or current detected by the sensing element 216, which may be aided by intimate contact of the sensing element 216 with the subterranean formation 201.

Figure 3A:
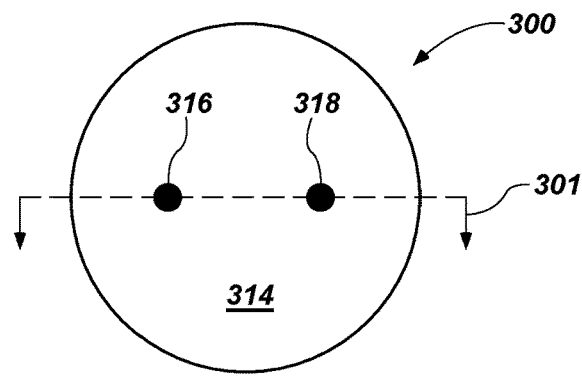
FIG. 3A is a top view of an embodiment of an instrumented cutting element of the present disclosure.

FIG. 3A is a top view of an embodiment of an instrumented cutting element 300 of the present disclosure. The cutting element 300 includes a diamond table 314 as the cutting surface to engage with the formation. The cutting element 300 further includes one or more sensing elements 316, 318 formed within the diamond table 314. In the embodiment shown in FIG. 3A, the cutting element includes two sensing elements 316, 318, which are separated from one another by a distance. Embodiments of the present disclosure may include any number of sensing elements. For example, a plurality of sensing elements 316, 318 may be present for a single cutting element 300 in order to obtain a temperature gradient for the cutting element 300. The plurality of sensing elements 316, 318 may be configured for one or more of resistivity sensing, piezoresistivity sensing, and thermistor sensing.

The sensing elements 316, 318 may be formed from and comprise an electrically conductive diamond-based material (e.g., doped polycrystalline diamond). Although diamond may be thermally conductive, polycrystalline diamond generally is not an electrically conductive material (although metal solvent catalyst present in interstitial spaces between the diamond grains may need to be removed from the polycrystalline diamond using, for example, a leaching process to prevent electrical conduction through the metal solvent catalyst material in the interstitial spaces). As a result, the diamond-based material may be a diamond material that is doped as previously mentioned to modify the electrical properties of the diamond material. Thus, the polycrystalline diamond of the diamond table 314 may be electrically insulating, while the polycrystalline diamond of the sensing elements 316, 318 may be electrically conductive. The diamond-based material that is electrically conductive may be referred to herein as a "doped diamond material."

The doped diamond material may be disposed within the diamond table 314, and may be configured to generate an electrical signal in response to experiencing a load. For example, the doped diamond material may exhibit a piezoresistive effect in response to a change in a pressure or stress. As a result, the cutting element 300 may be used to measure the piezoresistive effect. Through appropriate calibration, various parameters (e.g., stress, pressure, temperature, resistivity, etc.) may be inferred from the change in the output (i.e., electrical signal) from the cutting element 300 as different loads are experienced during drilling. Calibration may occur in a laboratory environment with one or more known loads being applied to the instrumented cutting element 300 and measuring the electrical signal response from the sensing elements 316, 318. The known loads may be applied to the instrumented cutting element 300 at various different orientations. The electrical signal response from the sensing elements 316, 318 may be recorded and associated with the known load.

In some embodiments, the sensing elements 316, 318 may further be employed as an electrode. Such an electrode may be used to measure resistivity of the formation, such as is described by U.S. Provisional Patent Application No. 61/623,042, filed Apr. 11, 2012, and entitled "Apparatuses and Methods for At-Bit Resistivity Measurements for an Earth-Boring Drilling Tool," the entire disclosure of which is incorporated herein by reference, as discussed above. Thus, for resistivity measurements of the rock formation, some sensing elements 316, 318 may be positive poles and negative poles for sending the electric stimulus into the formation and receiving the electric stimulus from the rock formation. The electric stimulus may also be referred to as an electric pulse. The electric stimulus may include a direct current (DC) signal or at such a low frequency that is in effect a DC measurement of resistance. In some embodiments, the electric stimulus may include spectral content. In other words, the electric stimulus may include a relatively high frequency signal propagation through the rock formation and provide a return path for the current to flow. Guard electrodes may be provided to enable resistivity measurements at different depths into the rock formation.

The information derived from the sensing elements 316, 318 may relate to drill bit characteristics, formation characteristics, as well as drill bit behavior. The cutting element 300 may provide passive data. The cutting element 300 may also be used to provide data for active bit control, such as to obtain information useful in intelligent control (e.g., active depth of cut control) of the drilling parameters or drilling system.

Figure 3B:
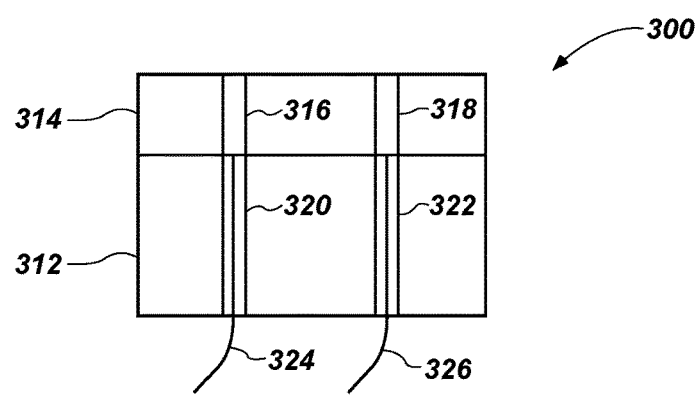
FIG. 3B is a cross-sectional side view of the instrumented cutting element of FIG. 3A.

FIG. 3B is a cross-sectional side view of the instrumented cutting element 300 of FIG. 3A, taken along section line 301. FIGS. 3C through 3F are cross-sectional side views of various additional embodiments of instrumented cutting elements 300 of the present disclosure. The cross-sectional views of FIGS. 3B through 3F show various configurations for the sensing elements 316, 318, as well as various methods for transmitting an electrical signal therefrom. In each of FIGS. 3B through 3F, the diamond table 314 is shown to be coupled with a substrate 312. The substrate 312 may be formed from a cemented tungsten carbide material (e.g., cobalt-cemented tungsten carbide). As discussed above, the diamond table 314 may be formed from a diamond material, while the sensing elements 316, 318 may be formed from a doped diamond material. In some embodiments, all or a portion of the diamond material of the diamond table 314 may be leached. Leaching the diamond table may include removing a metal solvent catalyst material (e.g., cobalt) from interstitial spaces between the diamond particles in the polycrystalline diamond material.

Referring specifically to FIG. 3B, the sensing elements 316, 318 may be configured as posts that extend from one end of the diamond table 314 to the other end of the diamond table 314, at the interface where the diamond table 314 and the substrate 312 meet. The substrate 312 may further include conduits 320, 322 formed therein. The conduits 320, 322 may be formed within the substrate 312 at locations that at least partially align with the sensing elements 316, 318.

The conduits 320, 322 may include electrical conductors 324, 326 that couple with the sensing elements 316, 318. In some embodiments, the electrical conductors 324, 326 may be surrounded by a dielectric material (e.g., a ceramic sheath) to electrically isolate the electrical conductors 324, 326 from the substrate 312. In some embodiments, the electrical conductors 324, 326 may be formed from the same material as the sensing elements 316, 318 (e.g., a doped diamond material). Because the electrical conductors 324, 326 in the substrate 312 may be less exposed to the hostile drilling conditions that are experienced by the diamond table 314, the electrical conductors 324, 326 may be formed from materials that provide less abrasion resistance. For example, the electrical conductors 324, 326 may be formed from niobium, aluminum, copper, titanium, nickel, molybdenum, tantalum, tungsten, boron, phosphorous, and other similar materials. A two-part sensing device (i.e., sensing elements 316, 318 and electrical conductors 324, 326 being formed from different materials) may provide for a better coefficient of thermal expansion (CTE) match with the two-part structure of the cutting element 300 (i.e., diamond table 314 and the substrate 312 being formed from different materials).

The conduits 320, 322 may be configured to receive the electrical signal from the sensing elements 316, 318, and transmit the electrical signal away from the cutting element 300. For example, the electrical signal may be transmitted to a processor (not shown) that may be part of a data collection module located in the earth-boring drill bit 100 (FIG. 1), the shank 120, other instrumentation in the bottom hole assembly, or to that which may be located above the surface of the formation. In some embodiments, where the sensing elements 316, 318 may be configured as electrodes, the conduits 320, 322 may transmit a signal (e.g., voltage) to the sensing elements 316, 318 from a power source (not shown). The cutting element 300 may be attached to the earth-boring drill bit 100 (FIG. 1) by brazing the cutting element 300 within a pocket 156 of the bit body 110, as previously described. The bit body 110 may include wiring for coupling with the conduits 320, 322 through the back of the pocket 156 in order to further transmit the electrical signal to the data collection module and/or receive a voltage from a power source.

Having individual conduits 320, 322 for each sensing element 316, 318, may enable the electrical signal from each sensing element 316, 318 to be read by a processor individually. In addition, each sensing element 316, 318 may be enabled to have a signal sent therethrough in a configuration where the sensing elements 316, 318 are used as electrodes. In such an embodiment, the sensing elements 316, 318 may be energized with a voltage causing current to flow through the formation. For example, the voltage may be a bias voltage of approximately 1 V with respect to a local ground potential. The current flowing between the sensing elements 316, 318 may be measured, such that a resistivity of the formation may be determined.

Figure 3C:
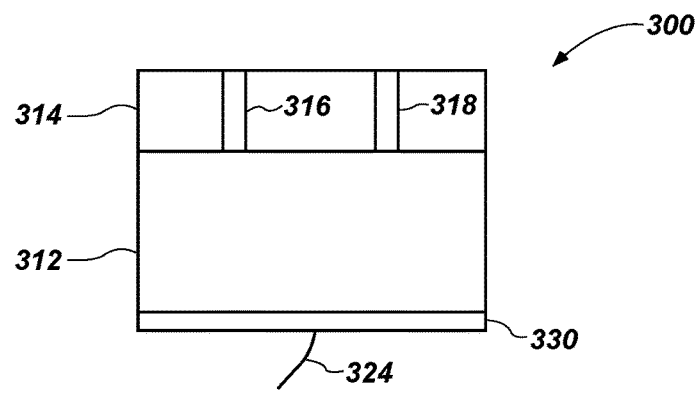
FIGS. 3C through 3F are cross-sectional side views of various additional embodiments of instrumented cutting elements of the present disclosure.

Referring specifically to FIG. 3C, the sensing elements 316, 318 may be configured as posts that extend from one end of the diamond table 314 to the other end of the diamond table 314 at the interface of the diamond table 314 and the substrate 312. The cutting element 300 may further include a conductive contact 330 coupled with the substrate 312 on a side of the substrate 312 opposite the diamond table 314. In some embodiments, the substrate 312 may be electrically conductive such that current may flow from the sensing elements 316, 318 to the conductive contact 330 for the electrical signal to be transmitted through the electrical conductor 324.

Figure 3D:
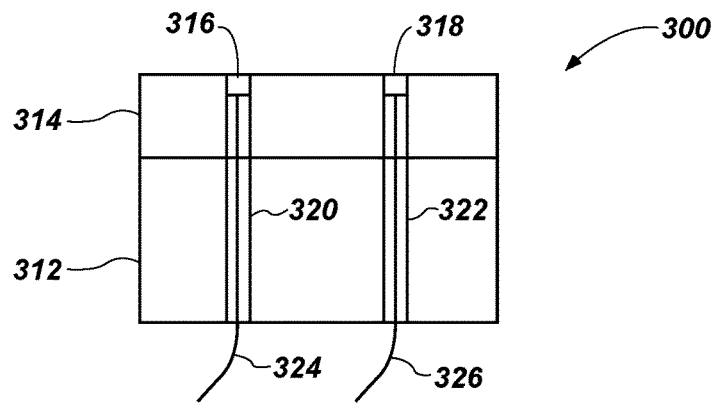

Referring specifically to FIG. 3D, the sensing elements 316, 318 may be configured as discrete volumes that only partially extend into the diamond table 314. For example, as shown in FIG. 3D, the sensing elements 316, 318 may begin at the face of the diamond table 314 and extend therein, but not to the interface of the diamond table 314 and the substrate 312. To obtain a signal from the sensing elements 316, 318, the conduits 320, 322 may extend into the diamond table 314 for the electrical conductors 324, 326 to couple with the sensing elements 316, 318.

Figure 3E:
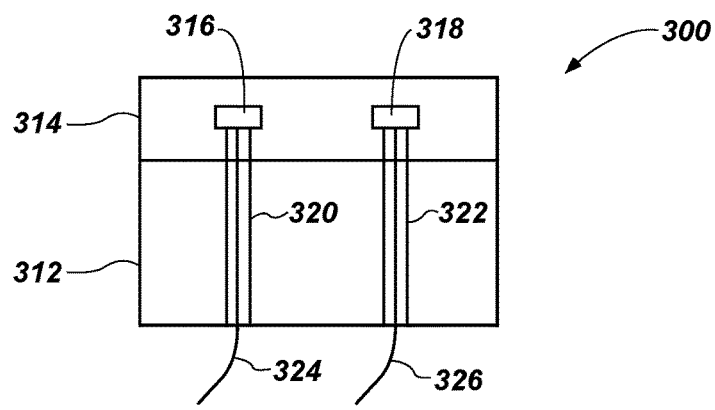

Referring specifically to FIG. 3E, the sensing elements 316, 318 may be configured as discrete volumes that are embedded within the diamond table 314. To obtain a signal from the sensing elements 316, 318, the conduits 320, 322 may extend into the diamond table 314 for the electrical conductors 324, 326 to couple with the sensing elements 316, 318.

Figure 3F:
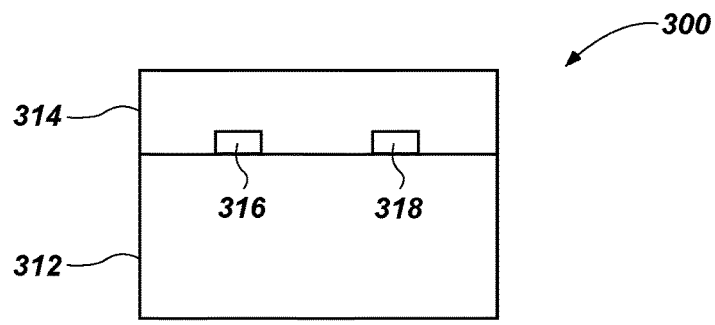

Referring specifically to FIG. 3F, the sensing elements 316, 318 may be configured as discrete volumes that only partially extend into the diamond table 314. For example, as shown in FIG. 3D, the sensing elements 316, 318 may begin at the interface of the diamond table 314 and the substrate 312 and extend into the diamond table 314, but not to the face of the diamond table 314. To obtain a signal from the sensing elements 316, 318, the current may flow through the substrate 312, or through conduits (not shown) as described above.

Figure 4:
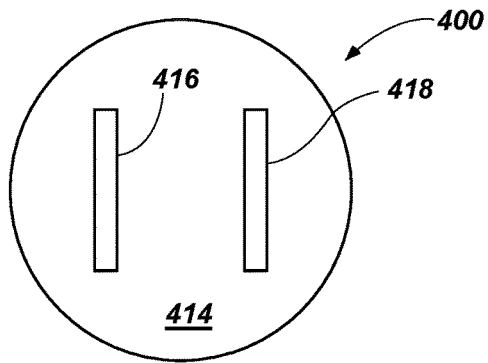
FIG. 4 is a top view of another embodiment of an instrumented cutting element of the present disclosure.

FIG. 4 is a top view of another embodiment of an instrumented cutting element 400 of the present disclosure. The cutting element 400 may include a plurality of sensing elements 416, 418 formed in diamond table 414 from a doped diamond material. The sensing elements 416, 418 may be formed in a linear shape that extends across the diamond table 414.

Figure 5:
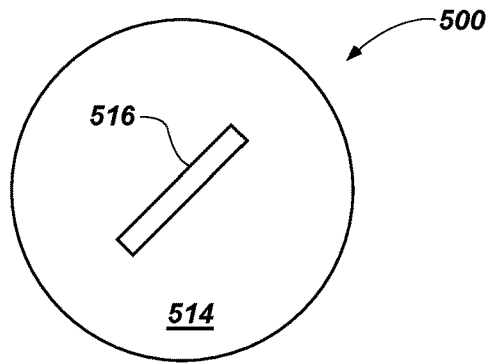
FIG. 5 is a top view of another embodiment of an instrumented cutting element of the present disclosure.

FIG. 5 is a top view of another embodiment of an instrumented cutting element 500 of the present disclosure. The cutting element 500 may include a single sensing element 516 formed in the diamond table 514 from a doped diamond material. The single sensing element 516 may also be formed in a linear shape across the diamond table 514.

Figure 6A:
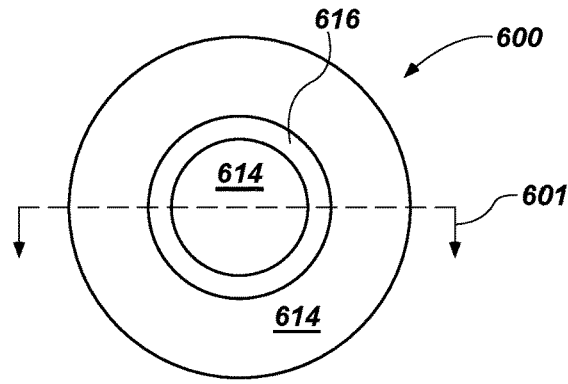
FIG. 6A is a top view of another embodiment of an instrumented cutting element of the present disclosure.

FIG. 6A is a top view of another embodiment of an instrumented cutting element 600 of the present disclosure. The cutting element 600 may include a sensing element 616 formed in the diamond table 614 from a doped diamond material. The sensing element 616 may be formed in an annular shape such that the non-doped diamond material of the diamond table 614 may surround the sensing element 616 both outside and inside the sensing element 616, which geometry may be used as a guard electrode.

Figure 6B:
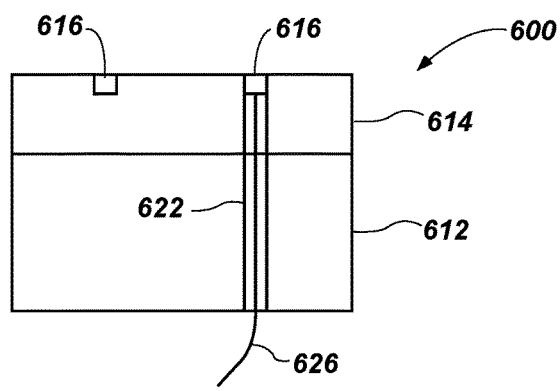
FIG. 6B is a cross-sectional side view of the instrumented cutting element of FIG. 6A.

FIG. 6B is a cross-sectional side view of the instrumented cutting element 600 of FIG. 6A. The cross-sectional view of FIG. 6B is taken along line 601 of FIG. 6A. In particular, the diamond table 614 is shown to be coupled with a substrate 612. As discussed above, the cutting element 600 may include a conduit 622 for transmitting the electrical signal away from the cutting element 600. The conduit 622 may include an electrical conductor 626, which may further be surrounded by a dielectric material. Because the sensing element 616 is a continuous annular shape within the diamond table 614, a single conduit 622 may be used to couple with the sensing element 616. Of course, multiple conduits (not shown) may be coupled with the sensing element 616 at one or more additional points.

Figure 7:
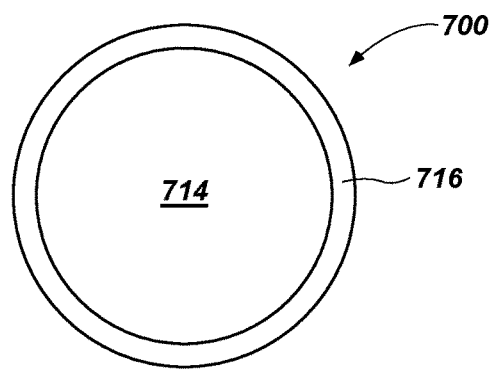
FIG. 7 is a top view of another embodiment of an instrumented cutting element of the present disclosure.

FIG. 7 is a top view of another embodiment of an instrumented cutting element 700 of the present disclosure. The cutting element 700 may include a sensing element 716 formed around the periphery of the diamond table 714.

Figure 8:
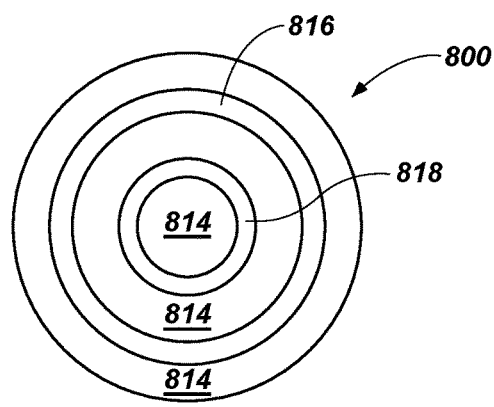
FIG. 8 is a top view of another embodiment of an instrumented cutting element of the present disclosure.

FIG. 8 is a top view of another embodiment of an instrumented cutting element 800 of the present disclosure. The cutting element 800 may include sensing elements 816, 818 that are formed as concentric annular shapes (i.e., toroid geometry) in the diamond table 814. In some embodiments, the center sensing element 818 may have a shape that is different from a toroid shape.

Figure 9:
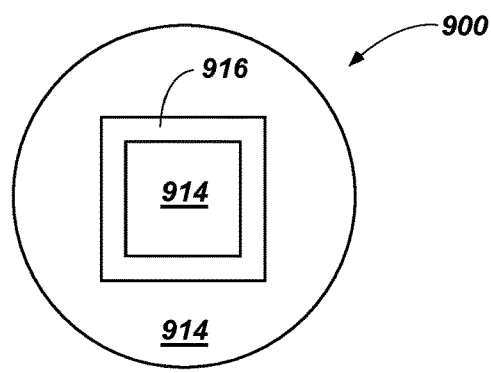
FIG. 9 is a top view of another embodiment of an instrumented cutting element of the present disclosure.

FIG. 9 is a top view of another embodiment of an instrumented cutting element 900 of the present disclosure.

The cutting element 900 may include a sensing element 916 that is formed as a hollow rectangular shape (e.g., square) in the diamond table 914.

Figure 10A:
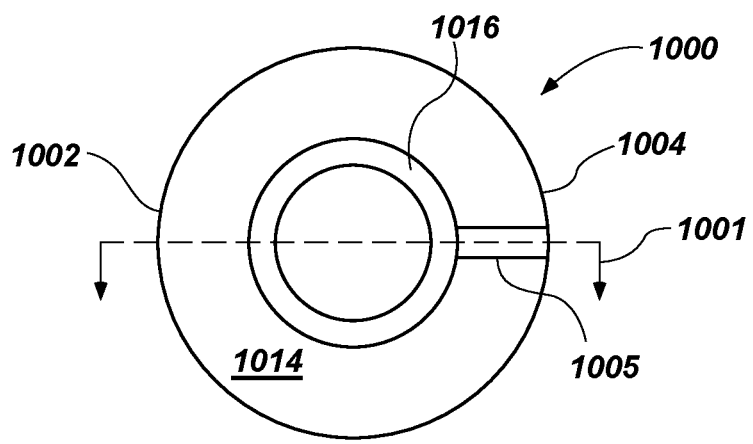
FIG. 10A is a top view of another embodiment of an instrumented cutting element of the present disclosure.

FIG. 10A is a top view of another embodiment of an instrumented cutting element 1000 element of the present disclosure. The cutting element 1000 may include a sensing element 1016 formed in the diamond table 1014 from a doped diamond material. The sensing elements 1016 may be formed in an annular shape such that the non-doped diamond material of the diamond table 1014 may surround the sensing element 1016 both outside and inside the sensing element 1016. The cutting element 1000 may include a conduit 1005 formed in the face of the diamond table 1014. The conduit 1005 may be formed in a groove cut out of the face of the diamond table 1014, and with a conductive element disposed therein. As a result, the conduit 1005 may extend across the face of the cutting element 1000 as opposed to extending through the cutting element 1000. In order to protect the conduit 1005 from being damaged during drilling, the conduit 1005 may be formed on a non-cutting surface 1004 of the cutting element 1000. The non-cutting surface 1004 may be opposite a cutting surface 1002 of the cutting element 1000.

Figure 10B:
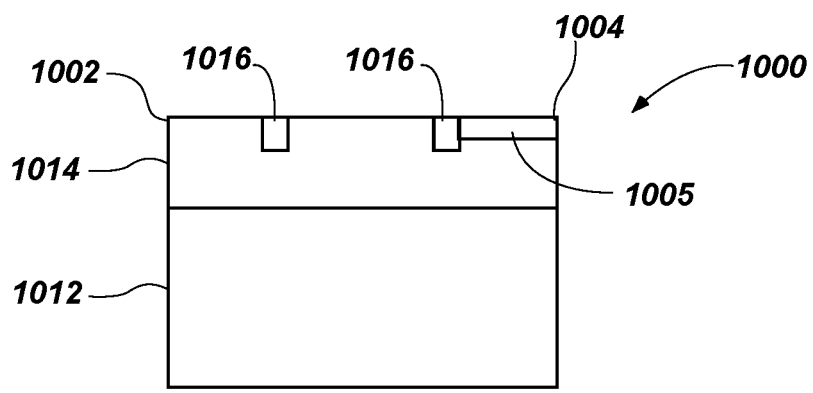
FIG. 10B is a cross-sectional side view of the instrumented cutting element of FIG. 10A.

FIG. 10B is a cross-sectional side view of the instrumented cutting element 1000 of FIG. 10A. The cross-sectional view of FIG. 10B is taken along the line 1001 of FIG. 10A. In particular, the diamond table 1014 is shown to be coupled with a substrate 1012. As discussed above, the conduit 1005 may be configured to couple with the earth-boring drill bit 100 (FIG. 1) outside of the substrate 1012 of the cutting element 1000. For example, the earth-boring drill bit 100 may include wiring at a location within a pocket 156 for the conduit 1005 to couple with when the cutting element 1000 is brazed into the earth-boring drill bit 100.

Figure 11A:
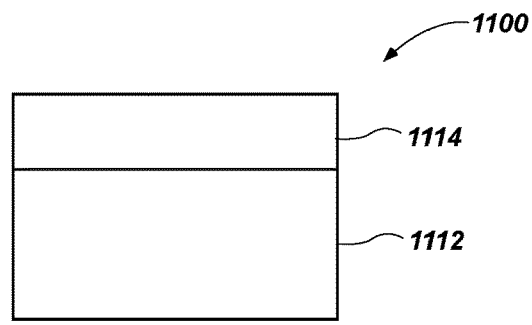
FIGS. 11A through 11E are used to illustrate a method of forming an instrumented cutting element according to another embodiment of the present disclosure, and show elements of the cutting element at various stages of formation of the instrumented cutting element.

FIGS. 11A through 11E are used to illustrate a method of forming an instrumented cutting element 1100 according to another embodiment of the present disclosure, and show elements of the cutting element 1100 at various stages of formation of the instrumented cutting element. Referring to FIG. 11A, the cutting element 1100 may be formed by sintering a diamond powder with a tungsten carbide substrate in an HTHP process to form a diamond table 1114 and an initial substrate 1112. The diamond powder and the tungsten carbide substrate may be together in a container that is placed in the HTHP press for undergoing the HTHP process. In some embodiments, the tungsten carbide substrate may be formed by sintering a powder in the HTHP sintering process at the same time as the diamond powder is sintered to form the diamond table 1114 on the substrate 1112. After completion of this initial HTHP process, the cutting element 1100 may be functional as a non-instrumented cutting element, which is where conventional cutting elements are usually completed.

Figure 11B:
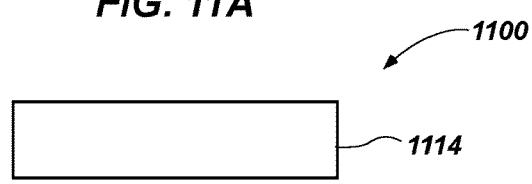

Referring to FIG. 11B, the initial substrate 1112 may be removed, such that the diamond table 1114 remains as a standalone (i.e., free-standing) object. The initial substrate 1112 may be removed by dissolving the tungsten carbide material to obtain a standalone diamond table 1114. The diamond table 1114 may be leached to remove a metal solvent catalyst material (e.g., cobalt) from within interstitial spaces between the inter-bonded diamond grains.

In some embodiments, the diamond table 1114 may be formed as a standalone object. In other words, the diamond table 1114 may be sintered by itself as a free-standing diamond disk. As a result, in some embodiments, the formation of the cutting element 1100 may begin with the standalone diamond table 1114 shown in FIG. 11B. Removing the initial substrate 1112 may be used, in some embodiments, for instrumenting cutting elements 1100 that have already been formed (e.g., retrofitting existing cutting elements).

Figure 11C:
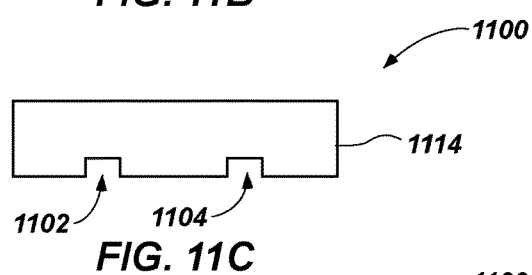

Referring to FIG. 11C, the sintered diamond table 1114 may have chambers 1102, 1104 formed therein. The chambers 1102, 1104 may be formed by removing at least a portion of the diamond table 1114 for the desired future shape of the sensing elements. Removing a portion of the diamond table 1114 may be performed by grinding, electric discharge machining (EDM), laser cutting, spark eroding, applying a hot metal solvent, and other similar methods. The chambers 1102, 1104 may have a shape that is desired for the sensing elements. For example, the chambers 1102, 1104 may include a shape as described with respect to FIGS. 3A through 10B.

Figure 11D:
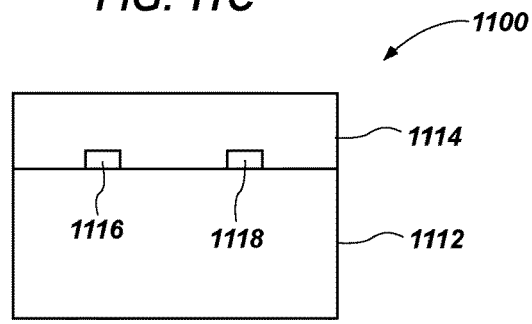

Referring to FIG. 11D, the cutting element 1100 may be subjected to another HTHP process. Diamond powder and one or more dopant elements may be provided within the chambers 1102, 1104 of the diamond table 1114, and the diamond table 1114 may be positioned adjacent a substrate 1112 as shown in FIG. 11D, and subjected to the another HTHP process. As a result, a doped diamond material is formed within the chambers 1102, 1104, the doped diamond material defining sensing elements 1116, 1118 in the previously sintered diamond table 1114. In some embodiments, an additional dielectric material may be disposed within the chambers 1102, 1104 between the doped diamond material and the diamond table 1114. This additional dielectric layer may be disposed in the chambers 1102, 1104 using a deposition process (e.g., chemical vapor deposition), applying a ceramic cement, or other similar methods used to deposit layers of dielectric material. In some embodiments, such as embodiments in which the diamond table 1114 is leached to remove metal solvent catalyst material therefrom, it may not be necessary or desirable to electrically isolate the doped diamond material from the remainder of the diamond table 1114 using such a dielectric material.

Forming the chambers 1102, 1104 in a sintered diamond table 1114 may enable the chambers 1102, 1104 to have the desired shape. During the HTHP process, the diamond table 1114 may undergo compaction and shrinkage. From a geometry and alignment standpoint, forming the chambers 1102, 1104 in a sintered diamond table 1114 may result in a more predictable shape and location for the sensing elements 1116, 1118 because the diamond table 1114 is already sintered, and may experience minimal shrinkage during the second HTHP process.

In addition, some embodiments may include the doped diamond material and/or the substrate 1112 being sintered separately, such that the sensing elements 1116, 1118 and/or the substrate 1112 may be bonded to the sintered diamond table 1114 through methods that do not involve use of an HTHP sintering process. Such a bonding process may include brazing, for example.

Figure 11E:
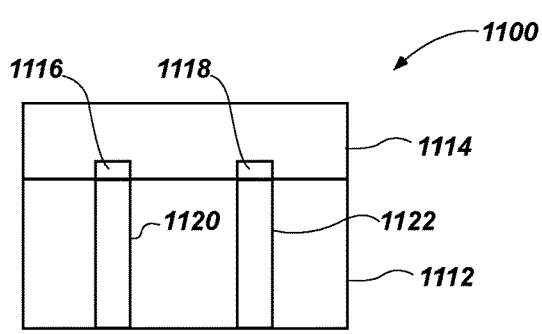

Referring to FIG. 11E, conduits 1120, 1122 may be formed through the substrate 1112 to align sufficiently to provide electrical contact with the sensing elements 1116, 1118. The conduits 1120, 1122 may be formed by removing a portion of the substrate 1112 to form passageways and disposing electrical conductors therein.

Figure 12A:
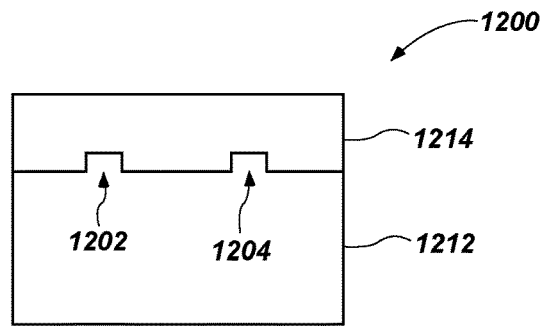
FIGS. 12A and 12B are used to illustrate another embodiment of a method of forming an instrumented cutting element according to the present disclosure.
Figure 12B:
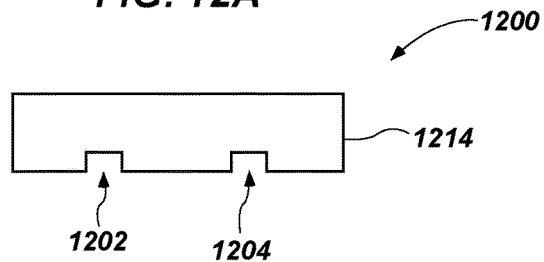

FIGS. 12A and 12B are used to illustrate another embodiment of a method of forming an instrumented cutting element 1200 according to the present disclosure. Referring to FIG. 12A, the cutting element 1200 may be formed by sintering a diamond powder with a tungsten carbide substrate in an HTHP process to form a diamond table 1214 and an initial substrate 1212. The diamond table 1214 may include chambers 1202, 1204 that are formed during the HTHP process by the shape of the initial substrate 1212. For example, the initial substrate 1212 may be selected to comprise at least one protrusion. The diamond table 1214 may be formed at least partially around the at least one protrusion. The protrusion may be used to create the chambers 1202, 1204 to have a shape that is desired for the sensing elements. For example, the chambers 1202, 1204 may include a shape as described with respect to FIGS. 3A through 10B. Referring to FIG. 12B, the initial substrate 1212 may be removed such that the chambers 1202, 1204 remain within the diamond table 1214. The remainder of the cutting element 1200 may be formed substantially as previously described with reference to FIGS. 11C through 11E.

Figure 13A:
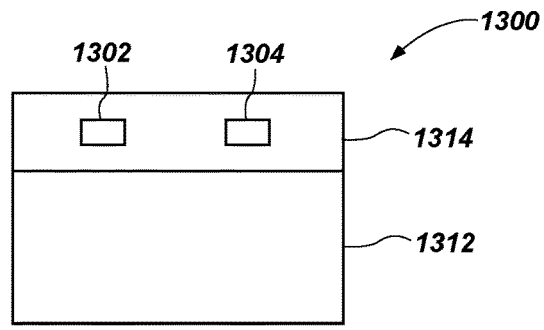
FIGS. 13A through 13C illustrate another embodiment of a method of forming an instrumented cutting element according to the present disclosure.
Figure 13B:
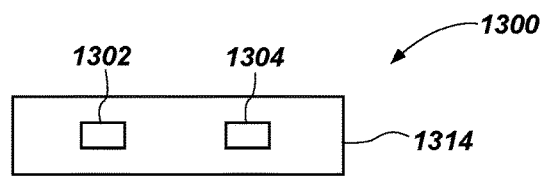
Figure 13C:
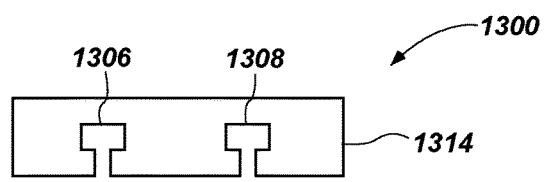

FIGS. 13A through 13C illustrate another embodiment of a method of forming an instrumented cutting element 1300 according to the present disclosure. Referring to FIG. 13A, the cutting element 1300 may be formed by sintering a diamond powder with a tungsten carbide substrate in an HTHP process to form a diamond table 1314 and an initial substrate 1312. The diamond table 1314 may include metal inserts 1302, 1304 that are embedded within the diamond table 1314. The metal inserts 1302, 1304 may be formed from a metal that may survive the HTHP process. For example, the metal inserts 1302, 1304 may be formed from nickel, titanium, etc.

Referring to FIG. 13B, the initial substrate 1312 may be removed similar to the methods described above. Referring to FIG. 13C, the metal inserts 1302, 1304 may be accessed and removed through the diamond table 1314. For example, the metal inserts 1302, 1304 may be accessed by removing a portion of the diamond table 1314 to form passageways to the metal inserts 1302, 1304. The metal inserts 1302, 1304 may be removed by dissolving the metal inserts 1302, 1304 through the passageways. As a result, empty chambers 1306, 1308 may remain within the diamond table 1314, which may be filled with the doped diamond material for the sensing elements. Thus, the metal inserts 1302, 1304 may have a shape that is desired for the sensing elements. The remainder of the cutting element 1300 may be formed substantially as previously described with reference to FIGS. 11C through 11E.

Additional non-limiting embodiments are described below.

Embodiment 1

A method of forming an instrumented cutting element, the method comprising: forming a free-standing sintered diamond table having at least one chamber in the free standing sintered diamond table; providing a doped diamond material within the at least one chamber; and attaching a substrate to the free standing sintered diamond table to form an instrumented cutting element including the doped diamond material disposed within the sintered diamond table on the substrate.

Embodiment 2

The method of Embodiment 1, further comprising: performing a first high temperature, high pressure sintering process to form a sintered diamond table on an initial substrate; and removing the initial substrate to form the free-standing sintered diamond table.

Embodiment 3

The method of Embodiment 2, wherein removing the initial substrate comprises dissolving the initial substrate.

Embodiment 4

The method of Embodiment 2, further comprising: selecting the initial substrate to comprise at least one protrusion; forming the sintered diamond table at least partially around the at least one protrusion; and removing the at least one protrusion from within the diamond table to form the at least one chamber in the free-standing sintered diamond table.

Embodiment 5

The method of any of Embodiments 1 through 4, further comprising removing a portion of the free-standing sintered diamond table to form the at least one chamber in the free-standing sintered diamond table.

Embodiment 6

The method of Embodiment 5, wherein removing a portion of the free-standing sintered diamond table comprises at least one of grinding, electric discharge machining, laser cutting, spark eroding, and applying a hot metal solvent to the free standing sintered diamond table.

Embodiment 7

The method of Embodiment 1, further comprising: providing at least one metal insert within the free-standing diamond table; and dissolving the at least one metal insert to form the at least one chamber within the free-standing sintered diamond table.

Embodiment 8

The method of any of Embodiments 1 through 7, wherein attaching a substrate to the sintered diamond table comprises subjecting the substrate and the free-standing sintered diamond table to a high temperature, high pressure process.

Embodiment 9

The method of Embodiment 8, further comprising forming at least one conduit in the instrumented cutting element, the at least one conduit coupled with the doped diamond material.

Embodiment 10

The method of Embodiment 9, wherein forming the at least one conduit comprises forming the at least one conduit through the substrate.

Embodiment 11

The method of Embodiment 10, wherein forming the at least one conduit further comprises forming the at least one conduit to extend through at least a portion of the sintered diamond table.

Embodiment 12

The method of Embodiment 9, wherein forming the at least one conduit comprises forming the at least one conduit to extend across a face of the sintered diamond table.

Embodiment 13

A method of forming an earth-boring tool, the method comprising attaching at least one instrumented cutting element to a body of an earth-boring tool, the at least one instrumented cutting element having a diamond table bonded to a substrate, the diamond table having at least one sensing element disposed at least partially within the diamond table, the at least one sensing element comprising a doped diamond material.

Embodiment 14

The method of Embodiment 13, further comprising forming the at least one instrumented cutting element.

Embodiment 15

The method of Embodiment 14, wherein forming the at least one instrumented cutting element comprises: forming a free-standing sintered diamond table having at least one chamber in the free-standing sintered diamond table; providing a doped diamond material within the at least one chamber to form the at least one sensing element; and attaching a substrate to the free-standing sintered diamond table to form the at least one instrumented cutting element including the doped diamond material disposed within the sintered diamond table on the substrate.

Embodiment 16

The method of Embodiment 15, further comprising: selecting an initial substrate to comprise at least one protrusion; forming a sintered diamond table at least partially around the at least one protrusion; and removing the at least one protrusion from within the diamond table to form the at least one chamber in the free-standing sintered diamond table.

Embodiment 17

The method of any of Embodiments 14 through 16, further comprising removing a portion of the free-standing sintered diamond table to form the at least one chamber in the free-standing sintered diamond table.

Embodiment 18

The method of any of Embodiments 14 through 17, further comprising forming at least one conduit in the instrumented cutting element, the at least one conduit coupled with the doped diamond material.

Embodiment 19

The method of Embodiment 18, further comprising disposing a dielectric material and a conductive element in the at least one conduit, the dielectric material electrically isolating the conductive element from the substrate.

Embodiment 20

The method of any of Embodiments 13 through 19, further comprising leaching at least a portion of the diamond table proximate the at least one sensing element.

Although the foregoing description contains many specifics, these are not to be construed as limiting the scope of the present disclosure, but merely as providing certain exemplary embodiments. Similarly, other embodiments of the disclosure may be devised that do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description.

What is claimed is:

1. A method of forming at least one instrumented cutting element for an earth-boring drilling tool, the method comprising:
   forming a sintered diamond table having at least one object embedded therein;
   removing a portion of the sintered diamond table to access the at least one object embedded therein;
   removing the at least one object to form at least one chamber; and
   providing an electrically conductive doped diamond material within the at least one chamber.

2. The method of claim 1, wherein removing a portion of the sintered diamond table includes at least one of grinding, electric discharge machining, laser cutting, spark eroding, or applying a hot metal solvent to form at least one passageway in the sintered diamond table to access the at least one object embedded therein.

3. The method of claim 1, further comprising leaching at least a portion of the sintered diamond table to remove metal solvent catalyst in interstitial spaces between inter-bonded diamond grains in the sintered diamond table proximate the electrically conductive doped diamond material provided within the at least one chamber.

4. The method of claim 1, wherein the at least one object is a at least one metal insert.

5. The method of claim 4, wherein forming the sintered diamond table having the at least one object embedded therein includes forming the sintered diamond table having plurality of objects embedded therein, removing a portion of the sintered diamond table to access the at least one object embedded therein comprises removing a portion of the sintered diamond table to access the plurality of embedded objects, removing the at least one object to form at least one chamber comprises removing the plurality of objects to form a plurality of chambers and providing an electrically conductive doped diamond material within the at least one chamber comprises providing an electrically conductive doped diamond material within each of the plurality of chambers.

6. The method of claim 4, wherein the at least one metal insert is formed from nickel or titanium.

7. The method of claim 4, wherein removing the at least one object embedded within the sintered diamond table includes dissolving the metal insert.

8. The method of claim 4, wherein forming the sintered diamond table having at least one object embedded therein includes forming the sintered diamond table as a free-standing sintered diamond table having the at least one object embedded therein.

9. The method of claim 8, wherein forming the free-standing sintered diamond table includes performing a first high temperature, high pressure (HTHP) sintering process.

10. The method of claim 9, further comprising performing a second HTHP sintering process on the free-standing sintered diamond table after providing the electrically conductive doped diamond material within the at least one chamber.

11. The method of claim 9, wherein forming the free-standing sintered diamond table includes:
performing the first HTHP sintering process to form the sintered diamond table attached to an initial substrate; and
removing the initial substrate to form the free-standing sintered diamond table.

12. The method of claim 11, further comprising attaching another substrate to the free-standing sintered diamond table to form an assembly comprising a sintered diamond table supported by the another substrate and electrically coupling the electrically conductive doped diamond material within the at least one chamber with a conductive material at an interface of the supported sintered diamond table and the another substrate.

13. The method of claim 12, wherein attaching the another substrate to the free-standing sintered diamond table to form an assembly comprising a sintered diamond table supported by the another substrate occurs while subjecting both the another substrate and the free-standing sintered diamond table with the electrically conductive doped diamond material within the at least one chamber to the second HTHP process.

14. The method of claim 12, further comprising forming at least one conduit in the another substrate of the assembly, the at least one conduit coupled with the electrically conductive doped diamond material within the at least one chamber of the supported sintered diamond table of the assembly.

15. The method of claim 14, wherein forming the at least one conduit further comprises forming the at least one conduit to extend through at least a portion of the supported sintered diamond table of the assembly.

16. A method of forming an earth-boring tool, the method comprising:
forming at least one instrumented cutting element by:
forming a sintered diamond table having at least one object embedded therein;
removing a portion of the sintered diamond table to access the at least one object;
removing the at least one object to form at least one chamber; and
providing a doped diamond material within the at least one chamber; and
attaching the at least one instrumented cutting element to a body of an earth-boring tool.

17. The method of claim 16, wherein the at least one object comprises at least one metal insert and removing the at least one object includes dissolving the at least one metal insert.

18. The method of claim 17, wherein forming the sintered diamond table having at least one object embedded therein includes sintering a diamond powder having the at least one metal insert therein with a tungsten carbide substrate in a first HTHP process to form the sintered diamond table having the at least one metal insert embedded therein and attached to an initial substrate.

19. The method of claim 18, further comprising:
removing the initial substrate prior to providing the doped diamond material within the at least one chamber; and
sintering the sintered diamond table and the doped diamond material within the at least one chamber in a second HTHP process.

20. The method of claim 19, further comprising disposing a dielectric material within the at least one chamber prior to providing the doped diamond material within the at least one chamber.

* * * * *